(12) United States Patent
Smith et al.

(10) Patent No.: US 7,201,225 B2
(45) Date of Patent: Apr. 10, 2007

(54) CONSERVING COMPONENTS OF FLUIDS

(75) Inventors: Kevin W. Smith, Houston, TX (US); Robert L. Sloan, Katy, TX (US)

(73) Assignee: Total Separation Solutions, LLC, Houston, TX (US)

( * ) Notice: Subject to any disclaimer, the term of this patent is extended or adjusted under 35 U.S.C. 154(b) by 0 days.

(21) Appl. No.: 11/352,889

(22) Filed: Feb. 13, 2006

(65) Prior Publication Data
US 2006/0180353 A1 Aug. 17, 2006

Related U.S. Application Data

(60) Provisional application No. 60/652,711, filed on Feb. 14, 2005, provisional application No. 60/652,549, filed on Feb. 14, 2005.

(51) Int. Cl.
E21B 43/40 (2006.01)
E21B 21/06 (2006.01)
B01D 17/02 (2006.01)
B01D 17/04 (2006.01)

(52) U.S. Cl. ............ 166/250.01; 166/267; 175/40; 175/66; 210/708; 210/737; 210/748

(58) Field of Classification Search ............ 175/66, 175/40, 206, 207; 166/250.1, 266, 267; 210/708, 210/737, 738, 748
See application file for complete search history.

(56) References Cited

U.S. PATENT DOCUMENTS

| | | | |
|---|---|---|---|
| 2,156,333 A * | 5/1939 | Roy et al. ............ 175/66 |
| 3,198,191 A | 8/1965 | Wyszomirski | |
| 3,533,480 A * | 10/1970 | Chenevert et al. ............ 175/66 |
| 3,944,548 A * | 3/1976 | Manganaro et al. ........ 544/192 |
| 4,370,885 A * | 2/1983 | Alekhin et al. .......... 73/152.19 |
| 5,188,090 A | 2/1993 | Griggs | |
| 5,239,948 A | 8/1993 | Sajewski | |
| 5,385,298 A | 1/1995 | Griggs | |
| 5,419,306 A | 5/1995 | Huffman | |
| 5,472,620 A * | 12/1995 | Huang ................ 210/748 |
| 5,494,585 A * | 2/1996 | Cox ................ 210/748 |
| 5,717,181 A * | 2/1998 | Colgate ............ 204/157.15 |
| 5,931,153 A | 8/1999 | Giebeler | |
| 5,957,122 A | 9/1999 | Griggs | |
| 6,015,535 A | 1/2000 | Brown et al. | |
| 6,016,798 A | 1/2000 | Selivanov | |
| 6,077,431 A * | 6/2000 | Kawanishi et al. ........ 210/609 |
| 6,156,708 A * | 12/2000 | Brookey et al. ............ 507/102 |
| 6,164,274 A | 12/2000 | Giebeler et al. | |
| 6,177,014 B1 | 1/2001 | Potter et al. | |
| 6,386,751 B1 | 5/2002 | Wootan et al. | |
| 6,436,879 B1 | 8/2002 | Brown et al. | |
| 6,581,859 B2 | 6/2003 | Adams et al. | |
| 6,595,759 B2 | 7/2003 | Crosta et al. | |
| 6,596,178 B1 | 7/2003 | Archibald | |
| 6,666,906 B2 * | 12/2003 | Hallman .................. 95/52 |
| 6,896,718 B2 * | 5/2005 | Hallman .................. 95/231 |
| 6,910,448 B2 | 6/2005 | Thoma | |

* cited by examiner

Primary Examiner—George Suchfield
(74) Attorney, Agent, or Firm—William L. Krayer

(57) ABSTRACT

A cavitation device is used to heat, concentrate and recycle or otherwise reuse dilute and other oil well fluids, brines and muds, and solution mining fluids, all of which commonly contain ingredients worthy of conservation. The cavitation device is powered by a Diesel engine whose exhaust may be used to heat the incoming fluid, and the product of the cavitation device is directed to a flash tank.

17 Claims, 3 Drawing Sheets

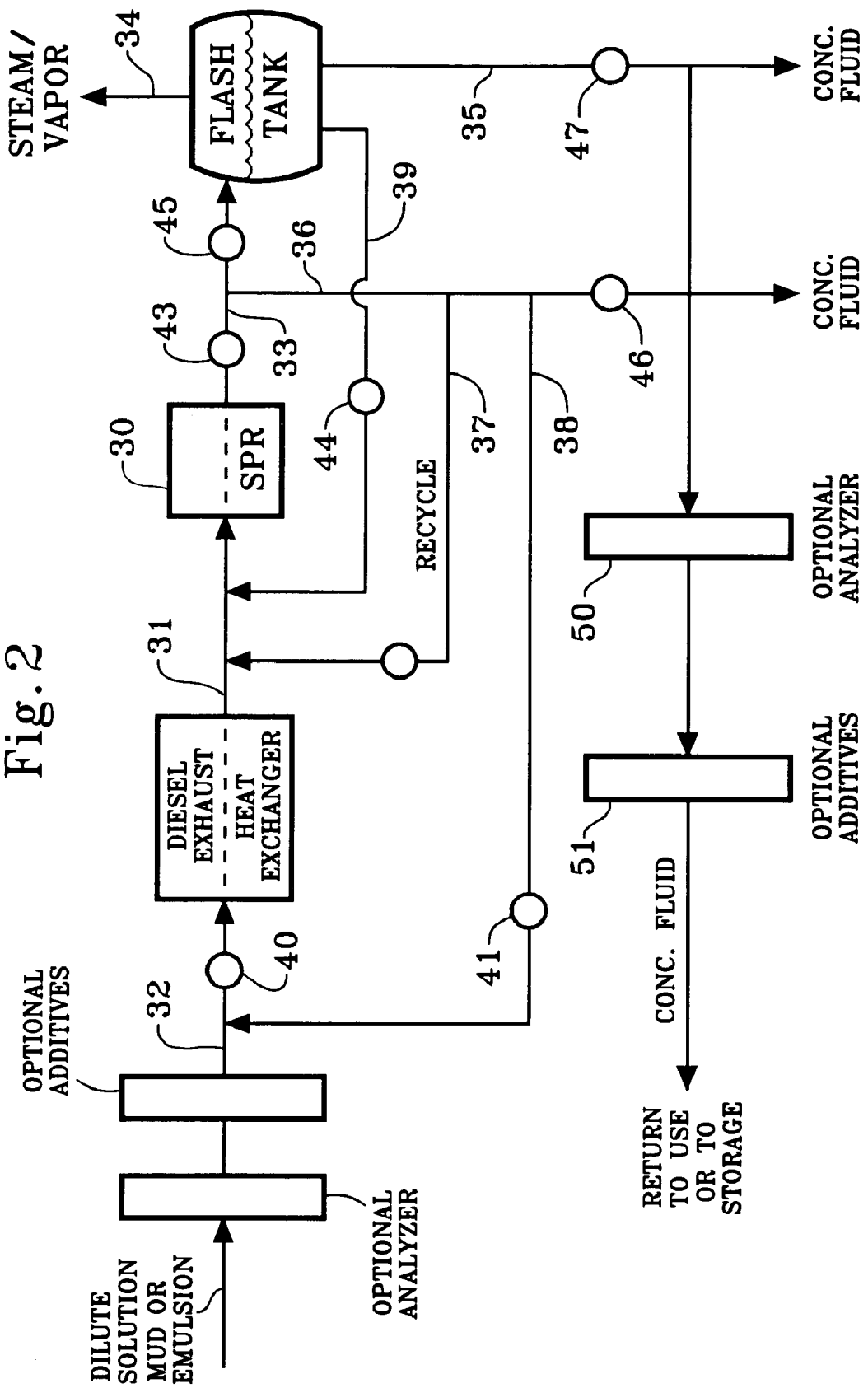

CONSERVING COMPONENTS OF FLUIDS

RELATED APPLICATION

This application claims the full benefit of provisional application 60/652,549 filed Feb. 14, 2005 and 60/652,711 filed Feb. 14, 2005.

TECHNICAL FIELD

A cavitation device is used to concentrate and recycle or otherwise reuse oil well fluids and muds, solution mining fluids, and industrial oil/water emulsions, all of which commonly contain ingredients worthy of conservation.

BACKGROUND OF THE INVENTION

In oil and other hydrocarbon production, completion and workover fluids are typically circulated down the string of tubes and upwards around the outside of the tubes, contacting the formation surface of the wellbore from which the hydrocarbons are to be produced. An original clear brine is typically prescribed to have a density which is a function of the formation pressure, The salts and other additives in the completion or workover fluid may be partially diluted by the formation water, as a result of contact with the formation. The brines can also become diluted deliberately by the well operator, who may add water to replace fluid lost into the formation, or to reduce the density following a decision that it is too high. Whatever the reason for increased density of the fluid is desirable in many instances to use additives to restore or increase density in the completion or workover fluid. Cesium and bromides work well as densifying agents in completion and workover fluids, but they are expensive, and, as with any other material which must ultimately be disposed of, should be recycled to the extent reasonably possible. This invention is, in one aspect, directed to the recycling of cesium, bromides, and other components in completion and workover fluids, for economic as well as environmental reasons.

As used herein, the term "heavy brine components" means calcium, zinc, ammonium and/or cesium as cations and chloride, formate and particularly bromide as anions from any source. Typical sources include cesium chloride or formate, calcium chloride, sodium chloride, sodium bromide, calcium bromide, zinc chloride, zinc bromide, ammonium chloride, and mixtures thereof as well as their cation and anion forming moieties from other sources.

Many oil well fluids contain polymers added for various purposes including to increase viscosity to help remove solids from the well and to retard the fluid loss into the formation. Polymers may be considered contaminants for various types of recycling, and in any event are difficult to remove, particularly when they are present with substantial quantities of solids.

Oil well muds generally include large proportions of solids, making their disposal difficult; also they contain additives which are beneficially recovered and recycled. Disposal is also difficult for other common oil well fluids such as water/oil (or oil/water) emulsions of widely varying composition including muds; recovering the more valuable components of emulsions for recycling or other use has been very difficult Not least among the difficulties of dealing with dilute, spent or used oil well fluids is the mundane but expensive task of trucking the fluids from remote producing wells to distant environmentally approved disposal sites or processing plants. Quite apart from the utter waste of materials, the cost of hauling dilute brines and other oil well fluids for disposal is a serious counterproductive burden to the producer.

As our invention is capable of concentrating and remediating any or all of the above described oil well fluids—brines, heavy brines, polymer-containing fluids, completion and workover fluids, muds, and emulsions—we may refer to these collectibely herein as "oil well fluids." Oil well fluids generally may include high solids contents, but muds in particular may include solids commonly in the range of up to about 45% by volume. Such high solids content is detrimental to any conventional distillation process which might be considered to treat an oil field mud for recycling. Likewise emulsions are not conducive to conventional distillation as a separate procedure. Conventional distillation methods of concentrating dilute and particularly contaminated solutions including heavy brine components result in scaling and other difficulties which ultimately frustrate the economics of recycling. A more economical method is needed for recycling the components of oil well fluids.

SUMMARY OF THE INVENTION

This invention regenerates dilute and contaminated solutions and slurries by passing them through a cavitation device which generates shock waves to heat the solution and remove moisture, thereby concentrating the solution and any small solids present. Preferably the cavitation device is one manufactured and sold by Hydro Dynamics, Inc., of Rome, Ga., most preferably the device described in U.S. Pat. Nos. 5,183,513, 5,184,576, 5,239,948, 5,385,298, 5,957,122 and particularly U.S. Pat. No. 5,188,090, all of which are incorporated herein by reference in their entireties. In recent years, Hydro Dynamics, Inc. has adopted the trademark "Shockwave Power Reactor" for its cavitation devices, and we use the term SPR herein to describe the products of this company and other cavitation devices that can be used in our invention.

Unlike a conventional distillation process, the SPR preserves the ratios of the cations and anions, as well as the solids, to each other in the solution that enters the SPR, while simply removing water. A conventional distillation process would tend to scale out some of the constituents in more or less difficultly predictable portions and relationships. The fact that in our process the ratios of the components remain essentially the same can be used to provide greater control over the process of reconstituting oil well completion and workover fluids. Either before or after passing through the SPR, the solution may be treated with additives to restore the original density, crystallization temperature, or balance of cations and anions, or to adjust the individual concentrations of components to respond to new conditions found in the well.

Definition: We use the term "cavitation device," or "SPR," to mean and include any device which will impart thermal energy to flowing liquid by causing bubbles or pockets of partial vacuum to form within the liquid it processes, the bubbles or pockets of partial vacuum being quickly imploded and filled by the flowing liquid. The bubbles or pockets of partial vacuum have also been described as areas within the liquid which have reached the vapor pressure of the liquid. The turbulence and/or impact, which may be called a shock wave, caused by the implosion imparts thermal energy to the liquid, which, in the case of water, may readily reach boiling temperatures. The bubbles or pockets of partial vacuum are typically created by flowing the liquid through narrow passages which present side depressions, cavities, pockets, apertures, or dead-end holes to the flowing liquid; hence the term "cavitation effect" is frequently applied, and devices known as "cavitation pumps" or "cavitation regenerators" are included in our definition. Steam generated in the cavitation device can be separated from the remaining, now concentrated, water and/or other liquid which frequently will include significant quantities of solids small enough to pass through the reactor. The term "cavitation device" includes not only all the devices described in the above itemized patents U.S. Pat. Nos. 5,183,513, 5,184,576, 5,239,948, 5,385,298, 5,957,122 and 5,188,090 but also the devices described by Selivanov in U.S. Pat. No. 6,016,798, Thoma in U.S. Pat. No. 6,910, 448, Crosta et al in U.S. Pat. No. 6,595,759, Giebeler et al in U.S. Pat. Nos. 5,931,153 and 6,164,274, Huffman in U.S. Pat. No. 5,419,306, Archibald et al in U.S. Pat. No. 6,596, 178 and other similar devices.

Many of these devices employ a shearing effect between two close surfaces, at least one of which is moving, such as a rotor, and/or at least one of which has cavities of various designs in its surface as explained above.

Our invention includes the optional step of filtering the fluid prepared by the SPR. Typically, in the prior art, the dilute, contaminated, or used oil well fluids are filtered before they are stored or processed by distillation. Our invention postpones filtration until after the used fluid is concentrated by passing through the SPR; filters and the filtration process can be engineered more efficiently to handle smaller volumes of liquid with higher concentrations of solids. Thus our invention includes a process of preparing a recycled oil well fluid comprising passing the fluid through a cavitation device and then filtering the concentrated fluid thus obtained. Persons skilled in the art will readily see that filtering significant quantities of solids after water removal rather than before contrasts dramatically with a distillation process.

It will be seen that our invention includes a method of conserving components of a used oil well fluid containing oil well fluid components comprising (a) concentrating said oilwell fluid by passing said oil well fluid through a cavitation device to obtain a concentrated oil well fluid containing oil well fluid components in concentrations higher than said used oil well fluid, (b) adjusting the composition of said concentrated oil well fluid by adding at least one moiety of at least one component of said concentrated oil will fluid to increase the concentration thereof in said concentrated oil well fluid, and (c) reusing the concentrated oil well fluid so adjusted.

Our invention also includes a method of conserving components of a used oil well fluid containing oil well fluid components comprising (a) concentrating said oilwell fluid by passing said oil well fluid through a cavitation device to obtain a concentrated oil well fluid containing oil well fluid components in concentrations higher than said used oil well fluid, (b) filtering the composition of said concentrated oil well fluid, and (c) reusing the concentrated oil well fluid so adjusted.

In another aspect, our invention includes a method of processing a used oil well fluid comprising optionally filtering said used oil well fluid, passing said used oil well fluid through a heat exchanger utilizing heat from the exhaust of a Diesel engine, powering a cavitation device with said Diesel engine, passing said oil well fluid through said cavitation device to increase the temperature thereof, recycling at least some of said used oil well fluid through said cavitation device to further increase the temperature of said used oil well fluid, passing said used oil well fluid into a flash tank to separate steam and vapor from said used oil well fluid and to obtain a concentrated fluid, removing at least a portion of said concentrated fluid from said flash tank, and reusing said at least a portion of said concentrated fluid in an oil well.

Also, our invention includes a method of upgrading a cesium containing solution comprising passing said cesium containing solution through a cavitation device to remove water therefrom, thereby obtaining a solution containing a higher concentration of cesium.

BRIEF DESCRIPTION OF THE DRAWINGS

FIG. 2 is a flow sheet illustrating the process for concentrating an oil well fluid or other fluid.

DETAILED DESCRIPTION OF THE INVENTION

Figure 1A:
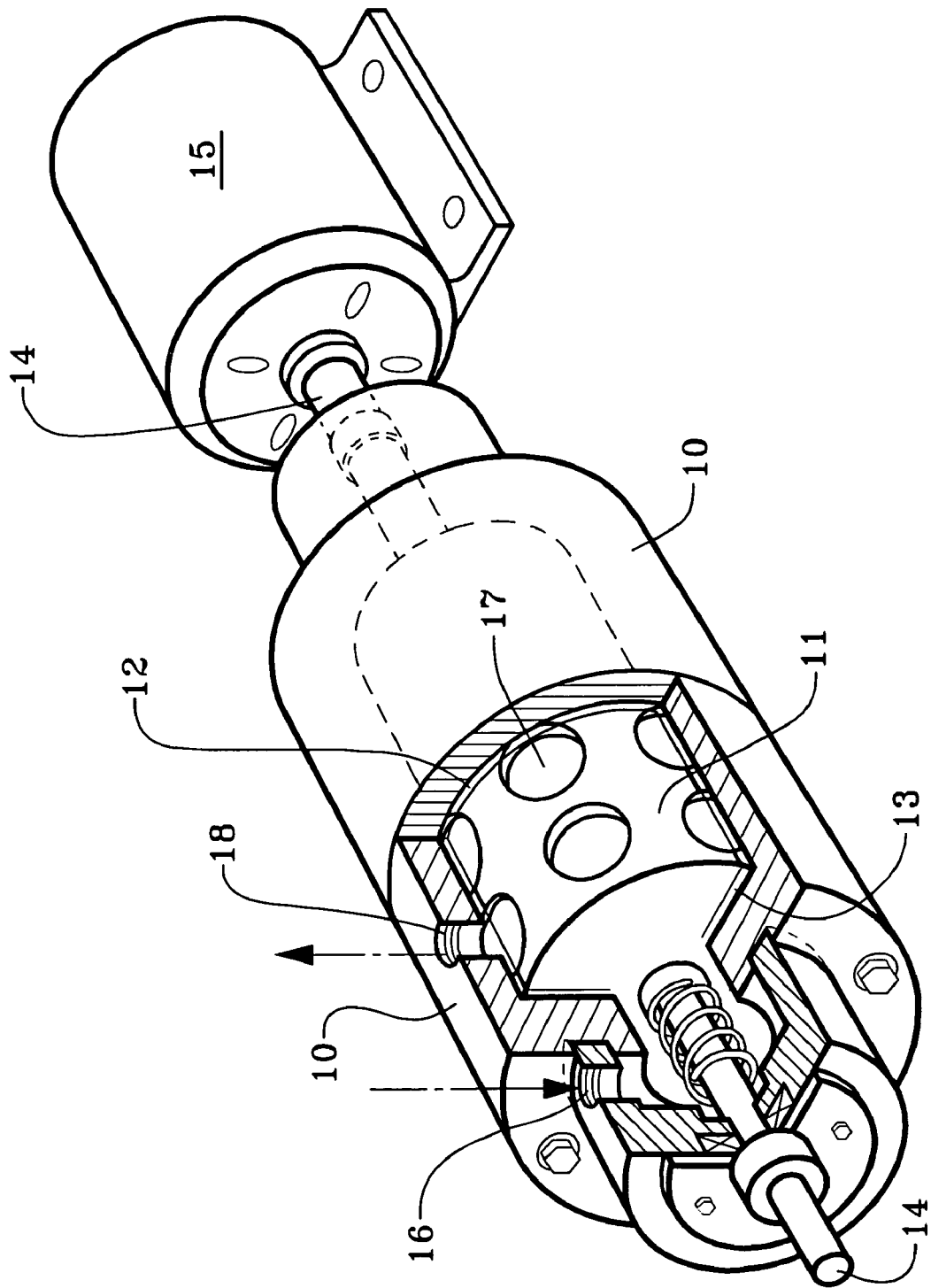
FIGS. 1a and 1b show variations of a cavitation device as utilized in our invention.
Figure 1B:
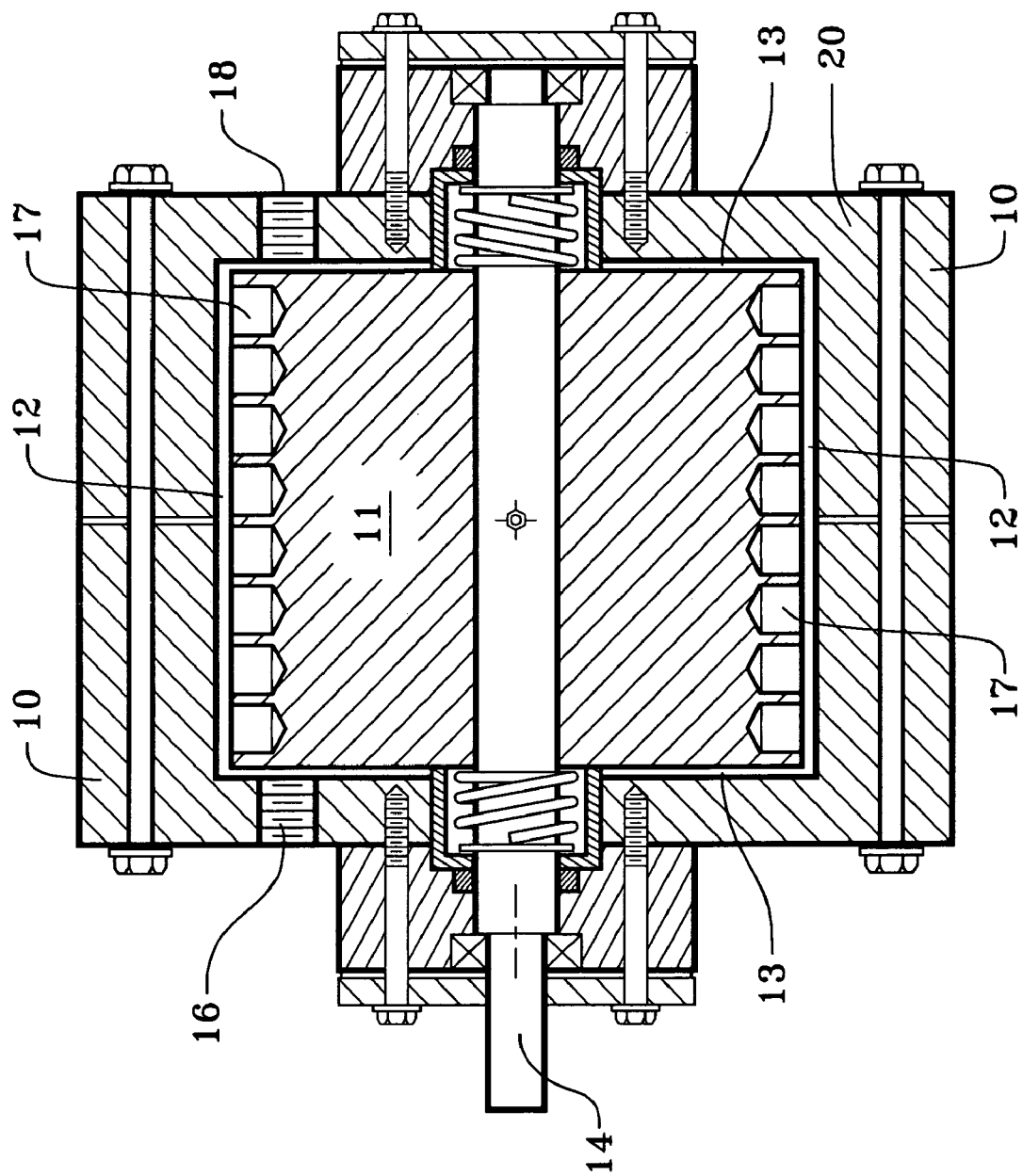

FIGS. 1a and 1b show two slightly different variations, and views, of the cavitation device, sometimes known as a cavitation pump, or a cavitation regenerator, and sometimes referred to herein as an SPR, which we use in our invention to regenerate solutions comprising heavy brine components.

FIGS. 1a and 1b are taken from FIGS. 1 and 2 of Griggs U.S. Pat. No. 5,188,090, which is incorporated herein by reference along with related US patents U.S. Pat. Nos. 5,183,513, 5,184,576, 5,239,948, 5,385,298, 5,957,122. As explained in the U.S. Pat. No. 5,188,090 and elsewhere in the referenced patents, liquid is heated in the device without the use of a heat transfer surface, thus avoiding the usual scaling problems common to boilers and distillation apparatus.

A housing 10 in FIGS. 1a and 1b encloses cylindrical rotor 11 leaving only a small clearance 12 around its curved surface and clearance 13 at the ends. The rotor 11 is mounted on a shaft 14 turned by motor 15. Cavities 17 are drilled or otherwise cut into the surface of rotor 11. As explained in the Griggs patents, other irregularities, such as shallow lips around the cavities 17, may be placed on the surface of the rotor 11. Some of the cavities 17 may be drilled at an angle other than perpendicular to the surface of rotor 11—for example, at a 15 degree angle. Liquid—in the case of the present invention, a solution containing heavy brine components—is introduced through port 16 under pressure and enters clearances 13 and 12. As the solution passes from port 16 to clearance 13 to clearance 12 and out exit 18, areas of vacuum are generated and heat is generated within the liquid from its own turbulence, expansion and compression (shock waves). As explained at column 2 lines 61 et seq in the U.S. Pat. No. 5,188,090, "(T)he depth, diameter and orientation of (the cavities) may be adjusted in dimension to optimize efficiency and effectiveness of (the cavitation device) for heating various fluids, and to optimize operation, efficiency, and effectiveness . . . with respect to particular fluid temperatures, pressures and flow rates, as they relate to rotational speed of (the rotor 11)." Smaller or larger clearances may be provided (col. 3, lines 9–14). Also the interior surface of the housing 10 may be smooth with no irregularities or may be serrated, feature holes or bores or other irregularities as desired to increase efficiency and effectiveness for particular fluids, flow rates and rotational speeds of the rotor 11. (col. 3, lines 23–29) Rotational velocity may be on the order of 5000 rpm (col 4 line 13). The diameter of the exhaust ports 18 may be varied also depending on the fluid treated. Pressure at entrance port 16 may be 75 psi, for example, and the temperature at exit port 18 may be 300° F. Thus the heavy brine components containing solution may be flashed or otherwise treated in the cavitation device to remove excess water as steam or water vapor. Note that the position of exit port 18 is somewhat different in FIGS. 1a and 1b.

Operation of the SPR (cavitation device) is as follows. A shearing stress is created in the solution as it passes into the narrow clearance 12 between the rotor 11 and the housing 10. This shearing stress causes an increase in temperature. The solution quickly encounters the cavities 17 in the rotor 11, and tends to fill the cavities, but the centrifugal force of the rotation tends to throw the liquid back out of the cavity, which creates a vacuum. The vacuum in the cavities 17 draws liquid back into them, and accordingly "shock waves" are formed as the cavities are constantly filled, emptied and filled again. Small bubbles, some of them microscopic, are formed and imploded. All of this stress on the liquid generates heat which increases the temperature of the liquid dramatically. The design of the SPR ensures that, since the bubble collapse and most of the other stress takes place in the cavities, little or no erosion of the working surfaces of the rotor 11 takes place, and virtually all of the heat generated remains within the liquid.

Temperatures within the cavitation device—of the rotor 11, the housing 10, and the fluid within the clearance spaces 12 between the rotor and the housing—remain substantially constant after the process is begun and while the feed rate and other variables are maintained at the desired values. There is no outside heat source; it is the mechanical energy of the spinning rotor that is converted to heat taken up by the solution and soon removed along with the solution when it is passes through exit 18. The rotor and housing indeed tend to be lower in temperature than the liquid in clearances 12 and 13. There is little danger of scale formation even with high concentrations of heavy brine components in the solution being processed.

Any solids present in the solution, having dimensions small enough to pass through the clearances 12 and 13 may pass through the SPR unchanged except in concentration. This may be taken into account when using the reconstituted solution in for oil well purposes. On the other hand, subjecting the water-soluble polymers to the localized cavitation process and heating will break them down or completely destroy them, a favorable outcome for many purposes. These effects will take place in spite of the possible presence of significant amounts of solids.

Concentrated and heavy or dense brines are more liable to crystallize in use than dilute brines, and accordingly their crystallization temperatures are of concern. The ability to concentrate heavy brine components content in a solution using a cavitation device leads to better control over crystallization temperature and the ability to achieve a good balance between crystallization temperature and density. Relationships between the concentrations and ratios of heavy brine component ions and other constituents in the solution rather precisely obtained by our invention means that the crystallization temperature of a completion or workover fluid can be more readily controlled while conserving substantially all of the components available to be saved.

The ability to concentrate heavy brine components content in a solution using a cavitation device also leads to better control over solution density. Relationships between the rather precisely obtained concentrations of heavy brine component ions and other constituents in the solution means that the density of a completion or workover fluid can be more readily matched with the density of the drilling fluid.

Where the fluid treated is a heavy brine containing cesium, it will commonly contain at least 2.5% cesium by weight. Our invention includes a method of treating a hydrocarbon producing formation comprising introducing into the formation through a well an oil well fluid containing at least 2.5% by weight cesium, whereby the fluid becomes diluted so that it contains less than 2.5% cesium by weight, circulating the fluid from the well, and passing at least a portion of the fluid through a cavitation device to remove moisture therefrom and produce a regenerated fluid containing at least 2.5% cesium by weight in said fluid.

Similar percentages may be found in cesium solutions used in mining cesium, and our invention may be quite useful for concentrating cesium solutions in cesium mining.

In FIG. 2, the dilute solution, slurry or emulsion (hereafter sometimes a fluid) enters in line 32 from the left, as depicted. It may come directly from a well, from a hold tank, or indirectly from another source. The SPR (Cavitation device) 30 requires a motor or engine to rotate it. Here, a Diesel engine, not shown, powers the SPR and generates hot exhaust gases, which are passed through the Diesel Exhaust Heat Exchanger, where the thermal energy of the exhaust gas is used to heat the incoming fluid in line 32 through a heat exchange surface or other conventional or expedient manner. Optionally the heat exchanger may be bypassed in a line not shown. The incoming fluid continues through line 31 to the SPR 30 which may be substantially as illustrated in FIGS. 1a and 1b. A supplemental pump, not shown, may assist the passage of the fluid. In the SPR 30, the fluid is heated as described with reference to FIGS. 1a and 1b, and the heated fluid is passed through line 33 to a flash tank, where steam is separated and removed in line 34. The steam may be recycled in a known manner for thermal energy preservation, for condensing to make substantially pure water, put to other useful purposes, or simply flashed to the atmosphere. Optionally a vacuum may be drawn on the flash tank to assist in removing the vapor and steam. Concentrated fluid from the flash tank, in line 35, can be recycled to the well, or analyzed in analyzer 50 in order to determine the best way to re-establish the ratios of ingredients, a desired crystallization temperature, a desired density, or other property. If needed according to the results of the analysis, or if desired for any reason, additives may be introduced from feeder 51. Concentrated fluid from the SPR 30 may bypass the flash tank as in line 36, and some or all of this may be recycled through line 37 to the SPR according to a predetermined desired efficiency for the system, balancing flow rates, heat input, and concentrations. Another option is to combine the two blowdowns of concentrated fluid in lines 35 and 36, and work with them thereafter either to reuse them directly or to adjust the concentration of one or more constituents for a desired purpose. In yet another option, line 38 may recycle at least some of the concentrate from the SPR for additional heat input from the Diesel Exhaust Heat Exchanger. Optional filters 40, 41, 42, 43, 44, 45, 46, and 47 may be installed at various points in the system for various purposes; filter 40 on incoming line 32 may comprise a screen for larger solids. Filter 43 is of special interest because, contrary to practice with a distillation unit, the SPR passes all solids through it while removing water. In the case of a used brine which may have incurred sc crystallization in spite of dilution, because of an imbalance in its constituents, the valuable crystallized components may be re-dissolved in the higher temperatures of the SPR and passed through, yet other solids are removed by the filter. Supplemental pumps and valves, not shown, may be deployed throughout the system to assure the desired flow rates and pressures, and to direct the fluids in the system to and through the various options described; automatic or manual controls for the valves and pumps may also be installed.

The following tables demonstrate the monetary savings available through the use of our invention. Table 1 shows the costs making a brine from beginning calcium bromide brines having densities ranging from 14.2 pounds per gallon to 15.1 pounds per gallon, by adding more calcium bromide ($CaBr_2$). The number of pounds of dry calcium bromide (salt) to be added is shown for each level together with an estimated cost of the calcium bromide. Table 2 shows the cost of the Diesel fuel required to achieve brines of the same densities by evaporation in the SPR without any additions to the brines at all. Savings are achieved not only in the cost of making up the denser brines but also, significantly, in the cost of inventory of the calcium bromide, which can be greatly minimized.

TABLE 1

DRY SALT ADDITION ESTIMATES

| Starting Gravity Lbs/Gal | Original Volume Bbls | Final Gravity Lbs/Gal | Final Volume Bbls | Dry Salt Added Lbs | Cost of Salt $ |
|---|---|---|---|---|---|
| 14.2 | 1,000 | 15.2 | 1074 | 89,806 | $134,709 |
| 14.3 | 1,000 | 15.2 | 1064 | 79,143 | $118,115 |
| 14.4 | 1,000 | 15.2 | 1057 | 70,352 | $105,528 |
| 14.5 | 1,000 | 15.2 | 1050 | 61,695 | $92,542 |
| 14.6 | 1,000 | 15.2 | 1044 | 53,589 | $80,384 |
| 14.7 | 1,000 | 15.2 | 1036 | 44,280 | $66,421 |
| 14.8 | 1,000 | 15.2 | 1028 | 35,366 | $53,048 |
| 14.9 | 1,000 | 15.2 | 1022 | 26,569 | $39,853 |
| 15.0 | 1,000 | 15.2 | 1014 | 17,733 | $26,599 |
| 15.1 | 1,000 | 15.2 | 1007 | 8,857 | $13,286 |

Note 1:
14.2 ppg Starting Cost $447.30/Bbl
Note 2:
$CaBr_2$ Dry $1.50/Lb

Our invention includes a method of conserving components of a used oil and water emulsion containing oil well fluid components, wherein the used oil and water emulsion is used oil well fluid, comprising (a) concentrating the emulsion by passing the emulsion through a cavitation device to obtain a concentrated emulsion containing oil well fluid components in concentrations higher than the used oil and water emulsion, (b) adjusting the composition of the concentrated emulsion by adding at least one moiety of at least one component of the concentrated emulsion to increase the concentration thereof in the concentrated emulsion, and (c) reusing the concentrated emulsion so adjusted The oil in the oil and water emulsion will desirably have a boiling point of at least 280° F. and such an emulsion comprising at least 70% by weight oil will, after step (b), comprise at least 90% by weight oil.

TABLE 2

CONCENTRATOR PERFORMANCE ESTIMATES

| Starting Gravity Lbs/Gal | Lb $H_2O$ to Evaporate Lbs | Final Volume of 15.2 ppg Fluid Bbls | Time to Concentrate Hrs | Diesel Fuel Required Gal | Diesel Cost $2/Gal |
|---|---|---|---|---|---|
| 14.2 | 56,000 | 846 | 56.0 | 1,848 | $3,696.00 |
| 14.3 | 49,700 | 863 | 50.0 | 1,650 | $3,300.00 |
| 14.4 | 43,000 | 877 | 43.0 | 1,419 | $2,838.00 |
| 14.5 | 38,000 | 893 | 38.0 | 1,254 | $2,508.00 |
| 14.6 | 34,700 | 900 | 35.0 | 1,155 | $2,310.00 |
| 14.7 | 27,200 | 920 | 27.0 | 891 | $1,782.00 |
| 14.8 | 19,000 | 940 | 21.0 | 693 | $1,386.00 |
| 14.9 | 16,000 | 954 | 16.0 | 528 | $1,056.00 |
| 15.0 | 9,500 | 970 | 9.5 | 314 | $628.00 |
| 15.1 | 5,500 | 980 | 3.5 | 181 | $362.00 |

Note 1:
Original Volume 1,000 bbls.
Note 2:
Does not include use of heat exchanger.

Emulsions encountered in oil production may vary considerably. Our system can separate oil-in-water or water-in-oil emulsions ranging from 1–95% oil and 99–5% water. Preferably the oil is a heating oil or other oil chosen for a high boiling temperature; these are commonly used for oil mud emulsions. A typical used oil mud emulsion comprising 80% oil and 20% brine (including the dissolved components and including solids) is readily treated in our system since temperatures in the SPR can be regulated to achieve evaporation of the water in the flash tank downstream from the SPR while the oil, having a higher boiling temperature, passes through without difficulty even though it may be subjected to locally violent cavitation effects in the SPR. A mixture of oil and water exiting the SPR in line 33 will separate on entering the flash tank held at an appropriate temperature, the steam being flashed off through conduit 34, which may be a vent, and/or remaining in the upper space of the flash tank while liquid water including dissolved salts is held in the bottom of the tank and/or drains into line 35 or 39 or both. Since the emulsion is substantially broken, the liquid water in the flash tank is covered by oil which may be continuously or intermittently tapped through a drain not shown and used or stored elsewhere. Oil mud emulsions typically include significant amounts of solids—up to 45% or more by weight—and our invention can handle such compositions without problems.

EXAMPLE

Oil Mud Emulsion

Using a 15" by 2" cavitation device, ten gallons of oil mud emulsion were treated to remove water. Initially the oil mud emulsion contained 18% water by volume, the balance being oil and solids typical of an oil well mud. The oil mud emulsion was sent through the cavitation device operating at 3600 RPM and recycled through the tank, which rapidly increased the temperature of the oil mud emulsion from room temperature to 240° F. Once that temperature was reached, the RPM of the cavitation device was controlled automatically in order to maintain an outlet temperature 240° F. At equilibrium, while recirculating the material and continuing to recycle through the tank, the speed was maintained at 1700 RPM, requiring about 13.5 HP. At 15 minutes, the material contained 13% water; at 30 minutes, it contained 10% water, and at 45 minutes the water was reduced to 5% by volume. Essentially none of the oil was evaporated As indicated above in the Summary of the Invention, the inventive method of conserving components of a used oil well fluid containing oil well fluid components comprises (a) concentrating the fluid, (b) adjusting the composition of the concentrated fluid by adding at least one moiety of at least one component of it, and (c) reusing the adjusted, concentrated fluid. It should be understood that a concentrated, adjusted, used oil well fluid, such as a used mud, can be reused as contemplated in step (c) by separating solids from it and using them in another oil well fluid.

The invention claimed is:

1. Method of conserving components of a used oil well fluid containing oil well fluid components comprising (a) concentrating said oil well fluid by passing said oil well fluid through a cavitation device to obtain a concentrated oil well fluid containing oil well fluid components in concentrations higher than said used oil well fluid, (b) adjusting the composition of said concentrated oil well fluid by adding at least one moiety of at least one component of said concentrated oil well fluid to increase the concentration thereof in said concentrated oil well fluid, and (c) reusing the concentrated oil well fluid so adjusted.

2. Method of claim 1 wherein said used oil well fluid is a used brine.

3. Method of claim 2 wherein said used brine includes less than 2.5% cesium prior to step (a) and wherein said brine contains more than 2.5% cesium after step (b).

4. Method of claim 2 wherein said used brine includes a bromide and wherein additional bromide is added in step (b).

5. Method of claim 2 wherein said at least one moiety of said at least one component of said concentrated oil well fluid added in step (b) is added to achieve a predetermined increased density in said concentrated oil well fluid.

6. Method of claim 2 wherein said at least one moiety of said at least one component of said concentrated oil well fluid added in step (b) is added to achieve a predetermined crystallization temperature for said concentrated brine.

7. Method of claim 1 wherein said used oil well fluid is a used mud.

8. Method of claim 1 wherein said reuse in step (c) of said concentrated oil well fluid comprises separating solids therefrom and using said solids in another oil well fluid.

9. Method of claim 1 wherein said used oil well fluid comprises a used oil and water emulsion.

10. Method of claim 9 wherein the oil in said oil and water emulsion has a boiling point of at least 280° F.

11. Method of claim 10 wherein said used oil and water emulsion comprises at least 70% by weight oil and, after step (b), said concentrated oil and water emulsion comprises at least 90% by weight oil.

12. Method of conserving components of a used oil well fluid containing oil well fluid components comprising (a) concentrating said oil well fluid by passing said oil well fluid through a cavitation device to obtain a concentrated oil well fluid containing oil well fluid components in concentrations higher than said used oil well fluid, (b) filtering the composition of said concentrated oil well fluid, and (c) reusing the concentrated oil well fluid.

13. Method of processing a used oil well fluid comprising optionally filtering said used oil well fluid, passing said used oil well fluid through a heat exchanger utilizing heat from the exhaust of a Diesel engine, powering a cavitation device with said Diesel engine, passing said oil well fluid through said cavitation device to increase the temperature thereof, recycling at least some of said used oil well fluid through said cavitation device to further increase the temperature of said used oil well fluid, passing said used oil well fluid into a flash tank to separate steam and vapor from said used oil well fluid and to obtain a concentrated fluid, removing at least a portion of said concentrated fluid from said flash tank, and reusing said at least a portion of said concentrated fluid in an oil well.

14. Method of claim 13 including adding at least one additive to said at least a portion of said concentrated fluid before reusing it in an oil well.

15. Method of claim 13 including analyzing said at least a portion of said concentrated fluid for at least one component thereof, and adjusting the concentration of at least one component therein before reusing it in an oil well.

16. Method of claim 13 including recycling at least some of said concentrated oil well fluid from said flash tank to said cavitation device.

17. Method of claim 13 wherein said used oil well fluid is an oil mud emulsion containing solids and at least a portion of said concentrated fluid is filtered or centrifuged to recover said solids.

* * * * *